United States Patent [19]

Smith

[11] 4,214,693
[45] Jul. 29, 1980

[54] METHOD OF MAKING WIRELINE APPARATUS FOR USE IN EARTH BOREHOLES

[76] Inventor: William D. Smith, 4217 Sarita Dr., Fort Worth, Tex. 76109

[21] Appl. No.: 910,844

[22] Filed: May 30, 1978

Related U.S. Application Data

[62] Division of Ser. No. 773,390, Mar. 2, 1977, Pat. No. 4,137,762.

[51] Int. Cl.² ............................................. B21D 39/04
[52] U.S. Cl. ..................................... 228/148; 29/517; 350/96.29; 350/96.34
[58] Field of Search ............... 29/624, 517; 350/96.29, 350/96.34; 228/148; 174/102 R; 73/151

[56] References Cited

U.S. PATENT DOCUMENTS

| | | | |
|---|---|---|---|
| 1,227,346 | 5/1917 | Trood et al. | 29/517 |
| 1,794,902 | 3/1931 | Johnson | 228/148 |
| 2,606,849 | 8/1952 | Dantsizen | 29/517 UX |
| 2,644,353 | 7/1953 | McLaughlin | 29/517 X |
| 2,975,087 | 3/1961 | Donald | 228/148 X |
| 2,998,472 | 8/1961 | Bondon | 29/517 UX |
| 3,430,330 | 3/1969 | Garner | 228/148 |
| 3,583,060 | 6/1971 | Sigmans | 29/517 X |

*Primary Examiner*—Charlie T. Moon
*Attorney, Agent, or Firm*—Wm. T. Wofford

[57] ABSTRACT

The invention provides an improved wireline that comprises one or more insulated conductors contained within a smooth walled metal sheath; which improved wireline is satisfactory to perform all of the normal wireline operations in an earth borehole and particularly in very deep boreholes; and in which the sheath material of the wireline is a metal having a high yield strength to weight ratio, and the sheath is swaged into intimate contact with the inner insulated conductor or conductors, such that the weight of the inner conductor or conductors and insulation is effectively supported by the sheath.

20 Claims, 9 Drawing Figures

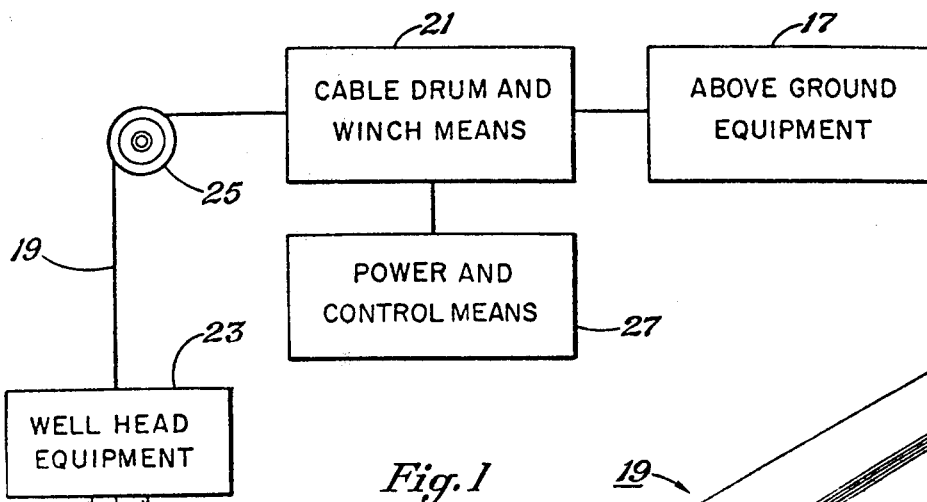
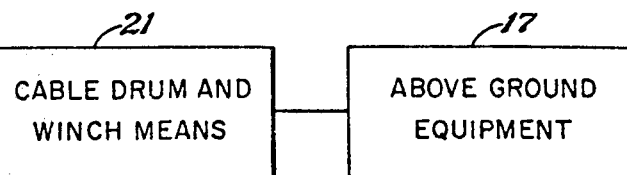
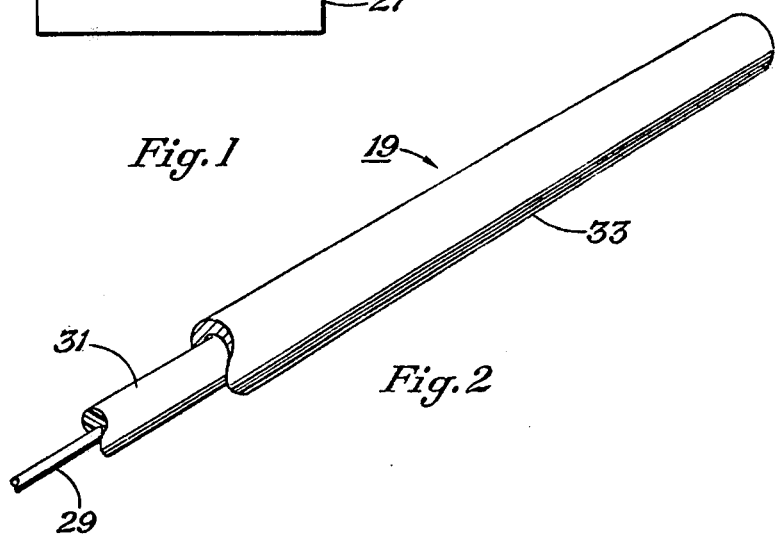
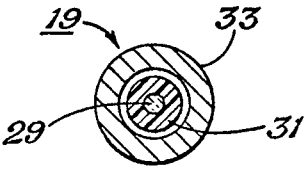
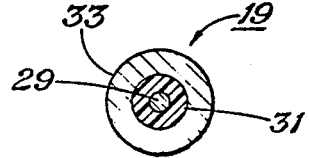
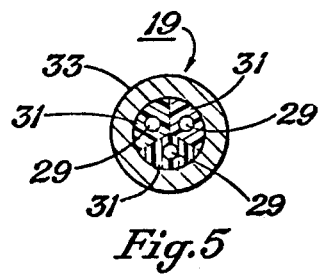

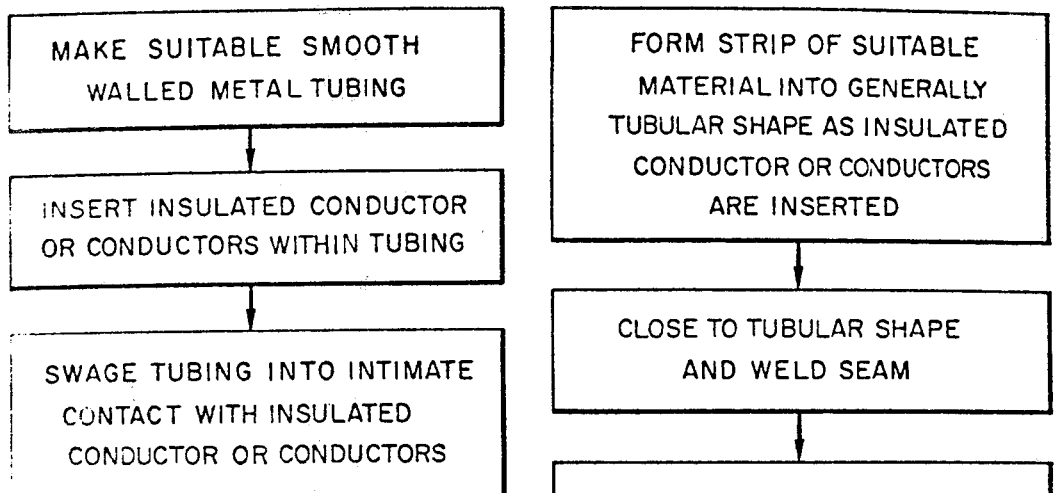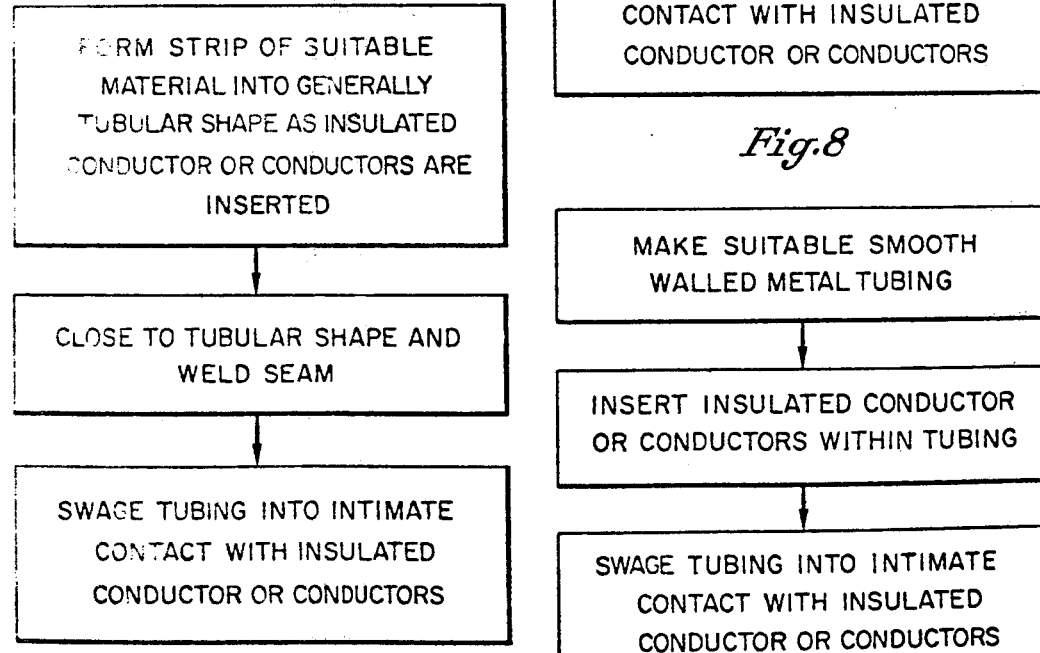

METHOD OF MAKING WIRELINE APPARATUS FOR USE IN EARTH BOREHOLES

This is a division of application Ser. No. 773,390 filed Mar. 2, 1977, now U.S. Pat. No. 4,137,762, issued Feb. 6, 1979.

FIELD OF THE INVENTION

The present invention relates to wireline apparatus and improved wireline and methods of making said improved wireline, for use in earth boreholes wherein a wireline is utilized to suspend a downhole tool in a borehole from aboveground cable drum and winch means and to transmit electrical signals between said tool and aboveground equipment.

BACKGROUND OF THE INVENTION

Many types of so-called wireline service operations are performed in earth boreholes, particularly in the petroleum industry, in oilwell drilling and production operations. The broad class of wireline service operations with which the present invention is concerned is the one wherein the wireline comprises one or more insulated electrical conductors contained without an outer sheath and the wireline is utilized both to suspend a downhole tool in a borehole and to transmit electrical signals between the downhole tool and aboveground equipment. The term "wireline" as used herein always refers to the type wireline as just described and never to the solid type wireline commonly referred to in the industry as a "slick line".

The conventional wireline that has been used for many years in the industry and which is still the industry standard, has a sheath or armor make up of one or more layers of steel wires, the first layer consisting of steel wires laid side by side about the periphery of the inner conductor insulation and spirally wound thereon, with the next layer consisting of steel wires laid side by side about the periphery of the first layer and spirally wound thereon, etc.. A typical single conductor wireline may be United States Steel Type 1N12SV, Electromechanical Cable, which has an inner conductor of stranded copper wire covered by propylene polymeric material, commonly referred to as propylene copolymer insulating material, a first armor layer consisting of twelve wires and a second armor layer consisting of eighteen wires. This wireline has a nominal diameter of ⅜ inches.

This conventional type wireline is subject to severe disadvantages. There is considerable void space between the armor or sheath wires, so that corrosive borehole fluids can fill the voids and cause rapid deterioration of the expensive wireline. Of even greater significance are the problems encountered in trying to "pack off" the line as it enters the borehole so that internal pressures at the borehole surface are contained. Several methods have been devised for such "pack off" but none is entirely satisfactory. The pressure that the "pack off" or sealing element must exert on the wireline for a successful seal can cause the armor wires to part and "bird-cage" or to break and stack up below the "pack off".

The disadvantage of the conventional type wireline above mentioned have long been recognized. Further, it has been recognized, for a long time, that these disadvantages would be overcome by the provision of a wireline having a solid sheath presenting a smooth, closed exterior surface. The use of such a sheath to house electrical conductors in well survey apparatus is disclosed by Terwilliger, et al, in U.S. Pat. No. 3,443,429.

The prior art is replete with examples of electric cables wherein an insulated electrical conductor or conductors are contained within a smooth walled metal sheath, and the methods of making same. Such prior art is exemplified by U.S. Pat. Nos. 1,846,070, 2,105,168, 3,005,038, 3,356,790, 3,436,287, 3,480,724, 3,567,846 and 3,602,633.

There is, however, no prior art of which I am aware, that discloses, or teaches how to make, a wireline that comprises one or more insulated conductors contained within a smooth walled metal sheath and which wireline would be satisfactory to perform all of the normal wireline operations in a borehole and particularly in very deep boreholes.

It is, accordingly, the object of this invention to provide an improved wireline that comprises one or more insulated conductors contained within a smooth walled metal sheath which improved wireline would be satisfactory to perform all of the normal wireline operations in a borehole and particularly in very deep boreholes.

This and other objects are effected by the invention as will be apparent from the following description, taken in accordance with the accompanying drawings, forming a part of this application.

BRIEF DESCRIPTION OF THE DRAWINGS

FIG. 1 is a schematic view of a typical wireline apparatus utilizing the present invention.

FIG. 2 is a schematic perspective view showing a length of wireline in accordance with one embodiment of the invention.

FIG. 3 is a schematic transverse section view of the wireline of FIG. 2, before the swaging operation.

FIG. 4 is a schematic transverse section view of the wireline of FIG. 2, after the swaging operation.

FIG. 5 is a schematic perspective view showing a length of wireline in accordance with another embodiment of the invention.

FIG. 6 is a block diagram illustrating the steps of making a wireline in accordance with one embodiment of the invention.

FIG. 7 is a block diagram illustrating the steps of making a wireline in accordance with another embodiment of the invention.

FIG. 8 is a block diagram illustrating the steps of making a wireline in accordance with a further embodiment of the invention.

FIG. 9 is a block diagram illustrating the steps of making a wireline in accordance with a still further embodiment of the invention.

DESCRIPTION OF PREFERRED EMBODIMENTS

In FIG. 1 there is shown a typical wireline apparatus utilizing the present invention. The apparatus comprises a downhole tool 11 disposed within the casing 13 of a borehole 15, aboveground equipment 17, a wireline 19 constructed in accordance with the invention and connected to the downhole tool 11 and via wellhead equipment 23, a sheave 25, and cable drum and winch means 21, to the aboveground equipment 17. The wireline 19 serves to transmit electrical signals between the downhole tool 11 and the aboveground equipment 17 and also to support the downhole tool 11 in suspended fashion from the cable drum and winch means 21 and sheave 25 in the borehole 15. Power and control means 27 is provided for the cable drum and winch means 21 so as to raise and lower the downhole tool 11 in the borehole 15. Each of the individual elements of the apparatus of FIG. 1, with the exception of the wireline 19, may be of a conventional type, and consequently need not be described in detail herein.

I have found that it is possible to provide a wireline having a suitably insulated conductor or conductors contained within a smooth walled metal sheath and which wireline would be satisfactory to perform all of the normal wireline operations in a borehole and particularly in very deep boreholes. I have found that this can be accomplished by making the metal sheath of a material having a high yield strength to weight ratio; inserting a suitably insulated conductor or conductors into smooth walled tubing made of such material; and then swaging the tubing into intimate contact with the insulated conductor or conductors, such that the weight of the inner conductor or conductors and insulation is effectively supported by the sheath.

FIG. 2 of the drawings shows a length of wireline 19 made in accordance with a preferred embodiment of the invention and comprising a conductor 29 surrounded by insulating material 31 which in turn is surrounded by a metal sheath 33.

FIG. 3 is a transverse section of the wireline of FIG. 1 prior to the swaging step and indicating a clearance or gap 35 between the insulation 31 and the sheath 33; while FIG. 4 is a transverse section of the wireline of FIG. 1 after the swaging operation. FIG. 5 is a transverse section of a wireline like that of FIG. 1 but with a plurality of insulated conductors 29.

The insulating material 31 may be of any suitable type that will provide adequate electrical insulation; will not be damaged by the temperatures to be encountered in manufacture and use; and that will withstand and maintain the pressures necessary to hold the requisite intimate contact with the metal sheath, and will also withstand the shock forces generated by the swaging operation. A preferred insulating material 31 is polytetrafluoroethylene (known as "TEFLON") or a fully fluorinated copolymer of hexafluoropropylene and tetrafluoroethylene (known as "TEFLON 100"). Additional preferred insulating materials 31 include propylene polymers and copolymers. The propylene monomers may be polymerized, or may be copolymerized with other monomeric units. These monomeric units include but are not limited to styrene, polyvinyl chloride and butyl rubber. Other conventional and well known thermoplastic materials may be used so long as they will meet the requisites above-mentioned. In some instances, for example, when there is a heat treating step in the manufacturing process after the insulated conductor or conductors are within the sheath, an insulating material capable of withstanding high temperatures may be used. Such materials include glass, ceramics and asbestos. A preferred material for this purpose is aluminum oxide. It should be noted that when a ceramic such as aluminum oxide is used, it will be reduced to a powder-like form by the swaging and/or drawing operations.

The conductor or conductors 29 are preferably stranded copper, although it is apparent that other conducting materials, in stranded or solid form, could be used. In some cases, one or more of the conductors may be strands of material suitable for practice of "fiber optics" techniques. These materials may typically be glass fibers, or coated glass fibers. When "fiber optics" type material is used, it can take several forms. It may be used together with one or more metal conductors, as for example, the metal conductor or conductors could be used to conduct power and the "fiber optics" material for the remaining signal transport functions. Where the "fiber optics" material is used with metal conductors, it may be wrapped about them so as to perform an insulating function. Alternatively, the "fiber optics" material could be extruded around the conductor or conductors as a continuous sheath; or a plurality of strands of "fiber optics" material could be disposed about the conductor or conductors and imbedded within a matrix of insulating material. The "fiber optics" material may be used alone, without any metal conductors. Where "fiber optics" material is used, the amount of other insulating material required will be reduced, and may, in some cases, be entirely eliminated.

The metal sheath 33 is preferably a material the tensile strength of which can be raised by cold working and which after swaging will have a tensile strength above that of mild steel. It is desirable that such materials should, after swaging, have a yield strength to weight ratio of at least 15 to 1. Preferably, the metal sheath 33 is made of stainless steel, as for example, Nos. 303, 304, 316.

In accordance with one embodiment of the invention, the sheath material can be of a type having a high yield strength to weight ratio after swaging and a heat treating step in the manufacturing process. In this embodiment, the sheath material may be carbon steel, for example, No. 4130. This sheath material would be used only in applications where no corrosion problems would be encountered.

One method of making the improved wireline is illustrated by the block diagram of FIG. 6 and comprises the steps of:
1. making a continuous piece of smooth walled metal tubing of a material the tensile strength of which can be raised by cold working and having an inside diameter such that a predetermined number of insulated conductors can be inserted into the tubing;
2. inserting the insulated conductors within the tubing, the conductors being of a length substantially the same as that of the tubing;
3. swaging the tubing into intimate contact with the insulated conductor or conductors such that it or they are supported by the tubing and consequently can be of length greater than could be supported by the conductor or conductors alone; the tubing, after swaging, having a tensile strength above that of mild steel.

Another method of making the improved wireline is illustrated by the block diagram of FIG. 7 and comprises the steps of:
1. forming a strip of suitable material into generally tubular shape as an insulated conductor or conductors are inserted;
2. closing the generally tubular shape to a tubular shape and welding the resulting seam;
3. swaging the welded tubing into intimate contact with the insulated conductor or conductors.

Still another method of making the improved wireline is illustrated by the block diagram of FIG. 8. This method is the same as that illustrated by the block diagram of FIG. 7, except that a drawing operation is inserted immediately prior to the swaging operation.

Yet another method of making the improved wireline is illustrated by the block diagram of FIG. 9 and comprises the steps of:

1. making a continuous piece of smooth walled metal tubing of a material of a type having a high yield strength to weight ratio after swaging and a heat treating step, as for example, carbon steel, and having an inside diameter such that a predetermined number of insulated conductors can be inserted into the tubing;
2. inserting the insulated conductors within the tubing, the conductors being of a length substantially the same as that of the tubing;
3. swaging the tubing into intimate contact with the insulated conductor or conductors such that it or they are supported by the tubing and consequently can be of length greater than could be supported by the conductor or conductors alone;
4. heat treating the swaged tubing; the tubing, after swaging and heat treating, having a tensile strength above that of mild steel.

Wireline made in accordance with the present invention does not have as much flexibility as conventional type wireline and consequently, care must be taken to minimize overflexing of the improved wireline. In this connection, it is necessary that the drum portion of the cable drum and winch means 21 as well as the sheave 25 should have an adequate diameter. Such diameter will differ for various wireline sizes and types of sheath material.

Swaging machines of a type suitable for performing the swaging operations involved in the present invention may be the rotary type manufactured by The Fenn Manufacturing Company, Newington, Connecticut, U.S.A.. A machine of this general type is disclosed by U.S. Pat. No. 3,149,509.

The foregoing disclosure and the showings made in the drawings are merely illustrative of the principles of this invention and are not to be interpreted in a limiting sense.

What is claimed is:

1. The method of making a wireline suitable for use with wireline apparatus for use in earth boreholes and wherein a wireline is utilized to suspend a downhole tool in a borehole from aboveground cable drum and winch means and to transmit electrical signals between said tool and aboveground equipment, said method comprising the steps of:
    a. making a continuous piece of smooth walled metal tubing of a material the tensile strength of which can be raised by cold working and having an inside diameter such that a predetermined number of insulated conductors can be inserted into said tubing;
    b. inserting said predetermined number of insulated conductors within said tubing, said conductors being of a length substantially the same as that of the tubing;
    c. swaging by means of hammering action said tubing into intimate contact with said insulated conductor or conductors, such that it or they are supported by said tubing and consequently can be of length greater than could be supported by said conductor or conductors alone; said tubing after swaging having a tensile strength above that of mild steel.
2. The method of claim 1 wherein said tubing after swaging has a yield strength to weight ratio of at least fifteen to one.
3. The method of claim 1 wherein said tubing is made of stainless steel.
4. The method of making a wireline suitable for use with wireline apparatus for use in earth boreholes and wherein a wireline is utilized to suspend a downhole tool in a borehole from aboveground cable drum and winch means and to transmit electrical signals between said tool and aboveground equipment, said method comprising the steps of:
    a. making a continuous piece of smooth walled metal tubing of a material the tensile strength of which can be raised by cold working and having an inside diameter such that a predetermined number of insulated conductors can be inserted into said tubing;
    b. inserting while making said tubing said predetermined number of insulated conductors within said tubing;
    c. swaging by means of hammering action said tubing into intimate contact with said insulated conductor or conductors, such that it or they are supported by said tubing and consequently can be of length greater than could be supported by said conductor or conductors alone; said tubing after swaging having a tensile strength above that of mild steel.
5. The method of claim 4 wherein said tubing is made from a strip of material that is formed into generally tubular shape as said conductors are inserted, then closed to tubular shape and the seam welded, all prior to the swaging step.
6. The method of claim 5 wherein said tubing after swaging has a yield strength to weight ratio of at least fifteen to one.
7. The method of claim 5 wherein said strip of material is stainless steel.
8. The method of claim 5 wherein said tubing is drawn after welding the seam and prior to the swaging step.
9. The method of claim 8 wherein said tubing after swaging has a yield strength to weight ratio of at least fifteen to one.
10. The method of claim 8 wherein said strip of material is stainless steel.
11. The method of making a wireline suitable for use with wireline apparatus for use in earth boreholes and wherein a wireline is utilized to suspend a downhole tool in a borehole from aboveground cable drum and winch means and to transmit electrical signals between said tool and aboveground equipment, said method comprising the steps of:
    a. making a continuous piece of smooth walled metal tubing of a material having a high strength to weight ratio after swaging and heat treating and having an inside diameter such that a predetermined number of insulated conductors can be inserted into said tubing;
    b. inserting said predetermined number of insulated conductors within said tubing, said conductors being of a length substantially the same as that of the tubing;
    c. swaging by means of hammering action said tubing into intimate contact with said insulated conductor or conductors, such that it or they are supported by said tubing and consequently can be of length greater than could be supported by said conductor or conductors alone;

d. heat treating the swaged tubing; said tubing, after swaging and heat treating having a tensile strength above that of mild steel.

12. The method of claim 11 wherein said tubing after swaging and heat treating has a yield strength to weight ratio of at least fifteen to one.

13. The method of claim 11 wherein said tubing is made of carbon steel.

14. The method of making a wireline suitable for use with wireline apparatus for use in earth boreholes and wherein a wireline is utilized to suspend a downhole tool in a borehole from aboveground cable drum and winch means and to transmit electrical signals between said tool and aboveground equipment, said method comprising the steps of:
   a. making a continuous piece of smooth walled metal tubing of a material having a high strength to weight ratio after swaging and heat treating and having an inside diameter such that a predetermined number of insulated conductors can be inserted into said tubing;
   b. inserting while making said tubing, said predetermined number of insulated conductors within said tubing;
   c. swaging by means of hammering action said tubing into intimate contact with said insulated conductor or conductors, such that it or they are supported by said tubing and consequently can be of length greater than could be supported by said conductor or conductors alone;
   d. heat treating the swaged tubing, said tubing, after swaging and heat treating having a tensile strength above that of mild steel.

15. The method of claim 14 wherein said tubing is made from a strip of material that is formed into generally tubular shape as said conductors are inserted, then closed to tubular shape and the seam welded, all prior to the swaging step.

16. The method of claim 15 wherein said tubing after swaging and heat treating has a yield strength to weight ratio of at least fifteen to one.

17. The method of claim 16 wherein said strip of material is carbon steel.

18. The method of claim 15 wherein said tubing is drawn after welding the seam and prior to the swaging step.

19. The method of claim 18 wherein said tubing after swaging and heat treating has a yield strength to weight ratio of at least fifteen to one.

20. The method of claim 19 wherein said strip of material is carbon steel.

* * * * *